Sheet 1, 2 Sheets.

S. B. Spaulding.

Reservoir Cooking Stove.

No. 2,494. Reissued Feb. 26, 1867.

Witnesses.

F. H. Johnson.

Louis. Potter.

Inventor.

Daniel E. Paris

Sheet 2, 2 Sheets.
S. B. Spaulding.
Reservoir Cooking Stove.
No. 2,494. Reissued Feb. 26, 1867.
Fig: 2. A.B.
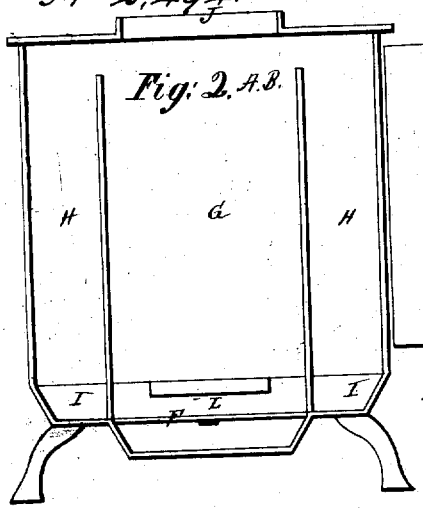
Fig: 3.
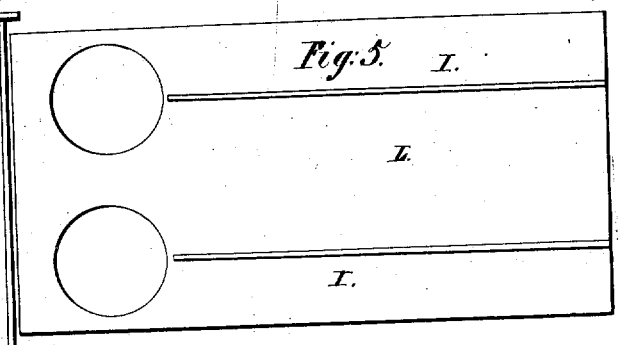
Fig: 4.
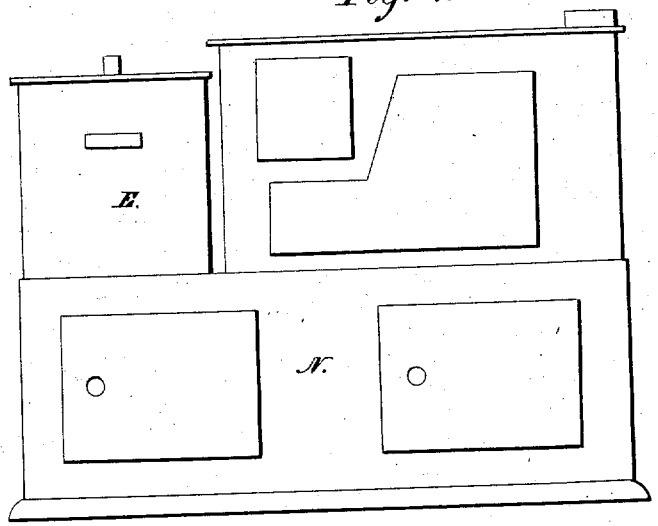
Witnesses.
F. H. Johnson.
Louis. Potter
Inventor.
Daniel E. Paris

United States Patent Office.

DANIEL E. PARIS, OF TROY, NEW YORK, ASSIGNEE BY MESNE ASSIGNMENTS OF SAMUEL B. SPAULDING.

*Letters Patent No.* 20,668, *dated June* 22, 1858; *additional improvement, May* 17, 1859; *reissue No.* 2,291, *dated June* 19, 1866; *reissue No.* 2,494, *dated February* 26, 1867.

COOKING STOVE.

The Schedule referred to in these Letters Patent and making part of the same.

TO ALL WHOM IT MAY CONCERN:

Be it known that Letters Patent of the United States, for Improvements in Cooking Stoves, were granted to Samuel B. Spaulding, of Brandon, in the county of Rutland, and State of Vermont, on the 22d day of June, 1858, and that after the grant of the said Letters Patent, and on application in due form of law by the said Spaulding, certain improvements of the said invention were added to the said Letters Patent on the 17th day of May, 1859; and whereas the said Letters Patent, with the addition thereto, have been assigned and transferred to DANIEL E. PARIS, of Troy, in the county of Rensselaer, and State of New York; and whereas, the said Letters Patent were believed to be inoperative by reason of a defective specification, and thereupon, and on the 19th day of June, 1866, new and amended Letters Patent were granted for the said invention and additional improvements to me, the said DANIEL E. PARIS, as such assignee, which said new and reissued Letters Patent are believed to be inoperative by reason of a defective specification: I, the said DANIEL E. PARIS, assignee, do hereby declare that the following is a full, clear, and exact description of the said invention and additional improvements, reference being had to the accompanying drawings, making part of this specification, in which—

Figure 1:
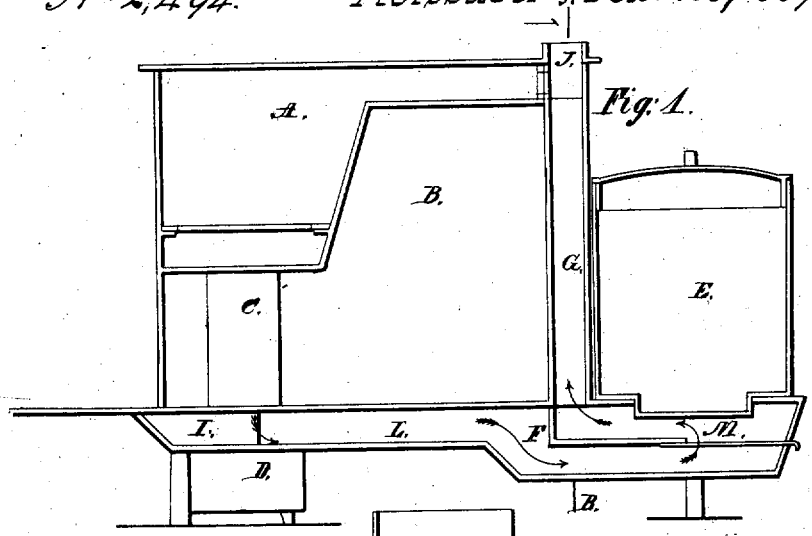

Figure 1 is a longitudinal vertical section of the stove so invented and patented by the said Spaulding.

Figure 2 a cross vertical section, taken in the plane of the line A B of fig. 1.

Figure 3:
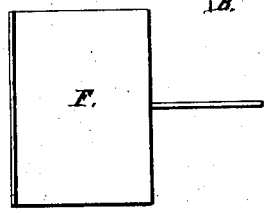

Figure 3, a separate plan view of the damper.

Figure 4, a side elevation of the stove with the said additional improvement.

Figure 5, a horizontal section thereof; and

Figure 6:
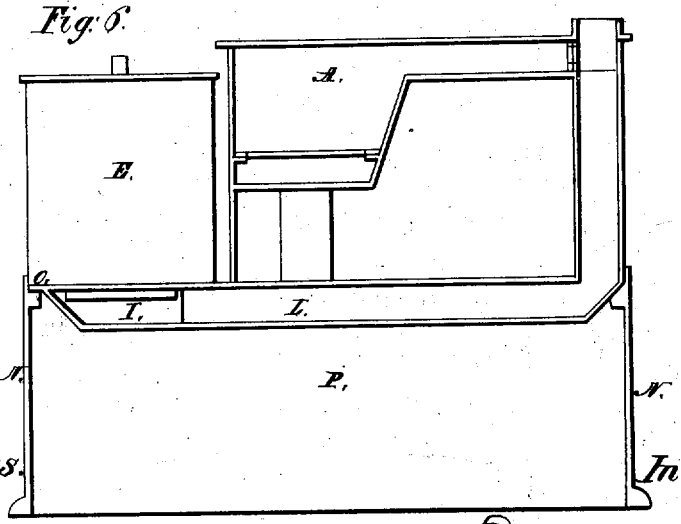

Figure 6, a longitudinal vertical section.

Prior to the said invention of the said Spaulding cooking stoves were in some instances provided with a boiler or reservoir for hot water, either by placing such boiler or reservoir on the top plate of the stove, and heated by the products of combustion acting on the bottom thereof projecting into the upper flue-space, or by forming a flue-space under or around the boiler above the exit pipe of the stove. Both of these plans were objectionable for the reason that the top of the boiler was too elevated for convenient access, and for the further reason that in one plan the water boiler or reservoir occupied space on the top plate of the boiler required for other culinary utensils, and that in the other plan, the boiler or reservoir being heated alone by the products of combustion after escaping from the exit pipe, it could not be sufficiently heated without the use of more fuel than was required for the other parts of the stove. The inconvenience of having the boiler so elevated led to the attempt to place it below the top plate of the stove by enlarging the flue-space back of the oven to a sufficient capacity to receive the boiler, but such stove was objectionable for the reason that it had a single flue in which the products of combustion from the fire-place passed under the oven, up the back, and over the top thereof to the exit pipe in front, and as much of the heat was absorbed by the boiler in the back flue, the products of combustion were so much reduced in temperature before passing over the top, that the heating of the oven was in consequence rendered still more unequal.

The invention of the said Spaulding, avoids all the objections to the said prior plans, and consists in arranging the water boiler or reservoir back of the oven and below the top plate of the stove in combination with flues so arranged, that the products of combustion pass down, and up back of the oven before reaching the exit pipe.

In fig. 1 of the accompanying drawings, A represents the fire-place, and B the oven, which is mainly behind with a portion extending under the fire-place. A tube, C, may be used extending down from the bottom of the fire-place for the discharge of ashes into a movable ash-pan, D, below. From the fire-place the products of combustion pass through a horizontal flue between the top of the oven and the top plate of the stove to the back, there divide and descend in two diving flues, H H, fig. 2, between the back plate of the oven and the back plate of the stove, one being on each side of a central flue, G. From the lower end of these diving flues the products of combustion pass in two side horizontal flues, I I, between the bottom of the oven and the bottom plate of the stove to the front, and then return through a central flue, L, between the two flues I I to the back on their way to the central flue G, between the two diving flues H H, which leads to the exit pipe J.

The stove so far as described is called a three-flued stove, and was known and used long prior to the invention of the said Spaulding, and is the one to which by preference he applied his said invention, it being recognized as the best plan of diving-flue stove, that is, the best of that class of stoves in which the products of combustion descend and ascend in flues back of the oven. The flues I I and L are extended for some distance back of the back plate of the stove, as at M, and to the top plate of this extension is fitted the bottom of the boiler or water reservoir E, the top of the said extension having an aperture to permit the products of combustion to act against the said boiler to heat the water therein. Along the said extension, for a short distance forward of it, the central flue L is sunken, as represented, and in this extension of the flue L there is a sliding damper, F, which, when pushed forward in the position represented, causes the products of combustion to pass under the boiler or reservoir E, to the central vertical flue G, as indicated by arrows, but when it is drawn back they pass directly into the said vertical flue to the exit pipe without acting directly on the boiler E. From the foregoing it will be seen that the boiler or water reservoir is brought down low enough for easy access, it is out of the way, and, what is very important, the products of combustion can act on it before reaching the exit pipe to give the heat required without the necessity of more fuel than is required for the ordinary use of the stove, whilst at the same time the oven will be equally heated. And although the best arrangement of diving flues to be used in combination with the said arrangement of boiler or water reservoir is that above described, as it best equalizes the heat of the oven, yet it will be obvious that an equivalent, although inferior arrangement, known as the two-flue stove, can be substituted for it, in that the products descend in one flue and ascend in another leading to the exit pipe.

And the said improvements of the said Spaulding, which were added to the said patent on the 17th day of May, 1859, consist, first, in locating the boiler or boilers on the hearth properly adapted thereto, in combination with the extension of the bottom flues under the hearth, so that the products of combustion, in passing forward and back to heat the bottom of the oven, shall act on the bottom of the boiler to heat the water therein; and second, in combining with the arrangement of flues between the bottom of the stove and the bottom of the oven, a surrounding case which extends down to the floor, and all around the said bottom flues, for the purpose of preventing the said flues from being cooled by the circulation of air in the room, and to serve for a chamber to receive articles required to be kept warm.

Figs. 4, 5, and 6, of the accompanying drawings, represent a stove similar to the one described in reference to figs. 1 and 2, with the exception of the projection back of the back plate of the stove, and the arrangement of the boiler thereon. The horizontal flues I I, L, are extended under the hearth, so that products of combustion circulate under the hearth plate, which is adapted to receive one or more boilers E, to be there heated. The door of the fire-place A is placed at the side so as not to interfere with the boiler or boilers. A casing, N, extends all around and from the base rim O, to the floor to form a hot-air chamber, P, provided with one or more doors. This casing prevents the flues from being cooled by the atmosphere of the room, forms a chamber in which to place articles required to be kept warm, and answers as a substitute for legs.

What is claimed as the invention of the said Spaulding, is—

Arranging the water boiler or reservoir back of the oven and below the top plate of the stove, substantially as described, in combination with the arrangement of flues described, or the equivalent thereof, as and for the purpose described.

What are claimed as the additional improvements of the said Spaulding, are—

The arrangement of a boiler or reservoir in front of the stove, in combination with the extension of the bottom flues of the stove under the said boiler, substantially as and for the purpose described.

And also the casing surrounding the bottom of the stove, in combination with the flues in the bottom, substantially as and for the purpose set forth.

DAN. E. PARIS.

Witnesses:

LOUIS POTTER,

F. H. JOHNSON.